(12) United States Patent
Block

(10) Patent No.: US 8,905,483 B2
(45) Date of Patent: Dec. 9, 2014

(54) ADJUSTABLE FOOTREST

(71) Applicant: Ryan Block, Aliso Viejo, CA (US)

(72) Inventor: Ryan Block, Aliso Viejo, CA (US)

(73) Assignee: Compass Designs LLC, Aliso Viejo, CA (US)

( * ) Notice: Subject to any disclaimer, the term of this patent is extended or adjusted under 35 U.S.C. 154(b) by 0 days.

(21) Appl. No.: 13/674,886

(22) Filed: Nov. 12, 2012

(65) Prior Publication Data
US 2014/0217800 A1    Aug. 7, 2014

(51) Int. Cl.
A47C 7/52     (2006.01)
A47C 16/02    (2006.01)
B60N 3/06     (2006.01)
B64D 11/00    (2006.01)
B64D 11/06    (2006.01)

(52) U.S. Cl.
CPC ............. *B60N 3/063* (2013.01); *B64D 11/00* (2013.01); *B64D 11/06* (2013.01); *B64D 2011/0648* (2013.01)
USPC ............ 297/423.15; 297/423.19; 297/423.23; 297/423.39; 297/423.4

(58) Field of Classification Search
CPC ................. A47C 16/02; B64D 2011/0648
USPC ............ 297/423.15, 423.19, 423.23, 423.39, 297/423.4
See application file for complete search history.

(56) References Cited

U.S. PATENT DOCUMENTS

| | | | | |
|---|---|---|---|---|
| 402,130 | A * | 4/1889 | Bedford | 297/423.15 X |
| 2,890,740 | A * | 6/1959 | Larson | 297/423.15 X |
| 3,856,352 | A * | 12/1974 | Jacobi, Sr. | 297/423.15 |
| 4,013,318 | A * | 3/1977 | Piper | 297/423.4 |
| 4,556,252 | A * | 12/1985 | Serex | 297/423.4 |
| 4,940,286 | A * | 7/1990 | Nguti | 297/423.19 X |
| 5,556,167 | A * | 9/1996 | Johnson Siemion | 297/423.15 |
| 6,375,266 | B1 * | 4/2002 | Ferguson et al. | 297/423.15 |
| 6,607,246 | B1 * | 8/2003 | Benden | 297/423.4 |
| 6,832,741 | B2 * | 12/2004 | Jarosz | 244/122 R |
| 7,322,655 | B1 * | 1/2008 | Williams et al. | 297/423.15 |
| 7,338,131 | B2 * | 3/2008 | Forgatsch | 297/423.15 |
| 7,448,688 | B2 * | 11/2008 | Farah | 297/423.39 |
| 7,452,034 | B2 * | 11/2008 | Jung | 297/423.4 X |
| 7,658,153 | B1 * | 2/2010 | Patoka | 108/44 |
| 7,954,900 | B2 * | 6/2011 | Shantha et al. | 297/423.4 |
| 7,967,387 | B2 * | 6/2011 | Langhorn | 297/423.4 |
| 7,988,235 | B2 * | 8/2011 | Clough | 297/423.15 |
| 8,123,300 | B2 * | 2/2012 | Stoffer | 297/423.39 |
| 8,205,936 | B2 * | 6/2012 | Alessandro | 297/423.23 X |
| 8,308,243 | B2 * | 11/2012 | Stoffer | 297/423.39 |
| 8,317,268 | B2 * | 11/2012 | Alkhattaf | 297/423.39 |
| 2006/0255643 | A1 * | 11/2006 | Gibson | 297/423.4 |
| 2008/0296957 | A1 * | 12/2008 | Clough | 297/423.15 |
| 2012/0292975 | A1 * | 11/2012 | Long | 297/423.15 |

\* cited by examiner

*Primary Examiner* — Rodney B White
(74) *Attorney, Agent, or Firm* — William Fitzpatrick; Fletcher Rohhe LLP

(57) ABSTRACT

A portable footrest device is provided, the footrest having a first and a second support portion, each of the first and second support portions having a first and second connector elements configured for releasable connection to a structure; and a first and a second foot portion coupled to said first and second support portions, wherein said first and second foot portions are configured to couple and decouple. A method for utilizing an enclosed space to rest a user's feet on a footrest, the foot rest having a foot portion is also provided.

17 Claims, 6 Drawing Sheets

ADJUSTABLE FOOTREST

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

FIELD OF THE INVENTION

The present invention relates generally to footrests. More particularly, the invention relates to a footrest that is portable, adjustable and adaptable.

BACKGROUND OF THE INVENTION

The commercial airline industry has enjoyed enormous growth since its inception in the early 1940's. Advances in technology have allowed a large percentage of the population domestically to be able to travel by air. This, however, has led to over-crowding in airplanes, and as a result has led airlines to decreasing the area between each seat, leaving minimal legroom for their passengers.

Further, all airline seats and uniform and vertically non-adjustable. As such, shorter passengers and children have difficult in that their feet hang off the chair, which is ergonomically damaging and can cause loss of circulation in legs and feet, tired and sore feet, and deep vein thrombois. The ability rest ones feet on a surface has been shown to mitigate risk of these injuries.

Attempts have been made to provide a footrest for airplanes. For example, U.S. Pat. No. 7,322,655 describes a footrest comprising a sling having two ends and a strap connected to each end of the sling. A user in a seat rests a foot in the sling where the straps of the sling are attached around an object in front of the seat. The ends of the straps 120, 130 may be connected by tying the straps 120, 130 together.

Another footrest is described in U.S. Pat. No. 6,832,741, in which a foot pad with longitudinally aligned strap members extend from opposite ends. Attached to the distal ends of the two strap members are clips that selectively attach the strap member to the framework or underside surface of seat or to a portable stand that may be included with the system.

More recent commercial airlines policies and pricing schemes has led passenger to check fewer bags at the check-in counter, and carrying on more bags into the cabin. Many times, leg room provided under the seat in front of a passenger is filled by the carry-on luggage, only decreasing the legroom for the passenger even farther. The footrests described above do not account for the decrease in legroom, and are not easily collapsible and attachable.

As such, there is a need for an adjustable in two axes, collapsible, easy to use footrest for an airplane seat that will fit in increasingly small spaces.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
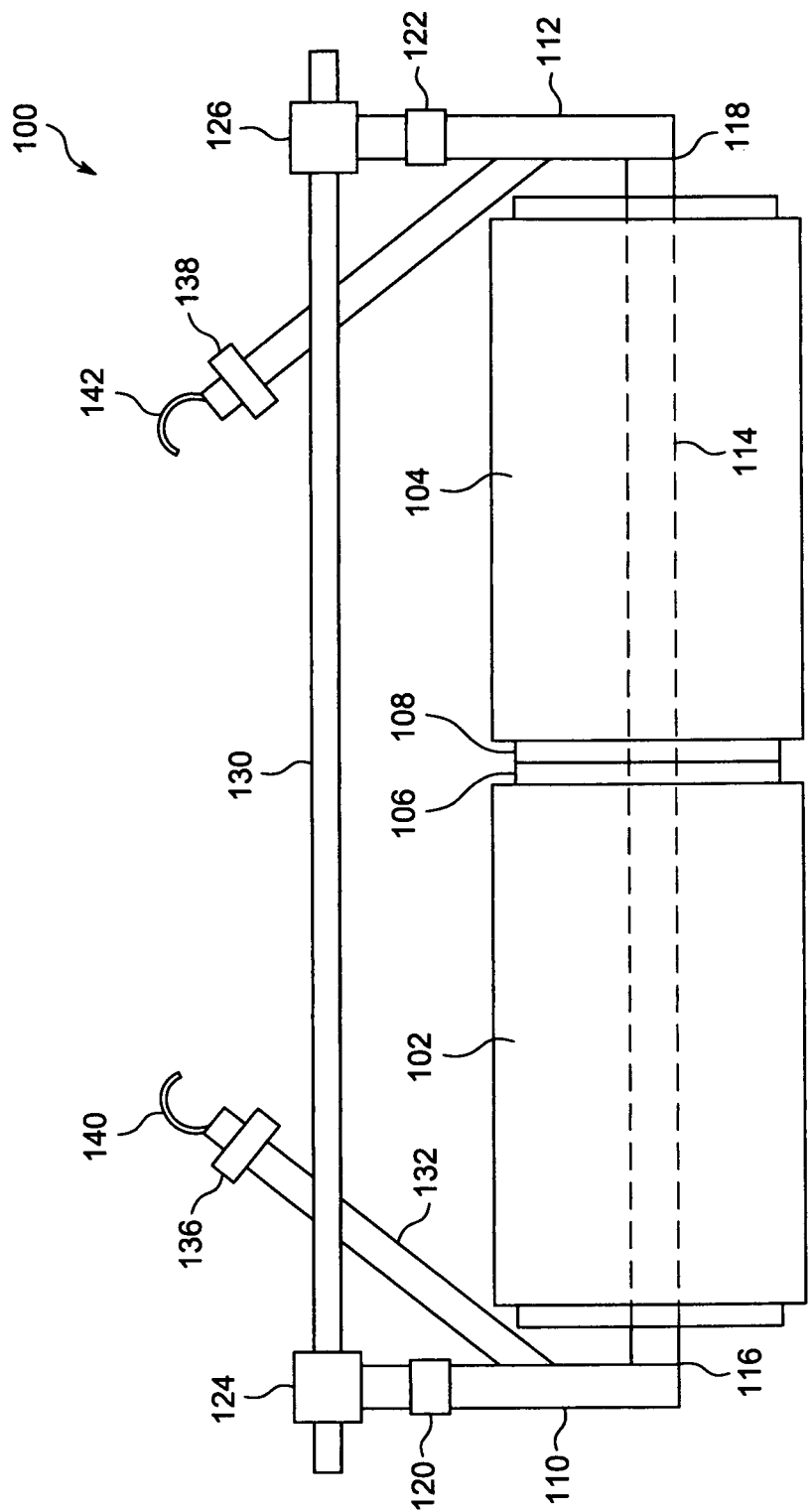
FIG. 1 is a top view of a portable and collapsible footrest in accordance with an embodiment of the present invention.

Unless otherwise indicated illustrations in the figures are not necessarily drawn to scale.

SUMMARY OF THE INVENTION

To achieve the forgoing and other aspects and in accordance with the purpose of the invention, a footrest that is portable, adjustable and adaptable is presented In one embodiment a portable footrest device is provided, The device comprises a first and a second support portion, each of the first and second support portions having a first and second connector elements configured for releasable connection to a structure; and a first and a second foot portion coupled to said first and second support portions, wherein said first and second foot portions are configured to couple and decouple.

In another embodiment a method for utilizing an enclosed space to rest a users feet on a footrest, the foot rest having a foot portion is provided, the method comprising attaching the footrest to a first structure with support members such that the footrest is hanging vertically from said structure, adjusting the support members vertically to correspond to a users seated leg length, connecting the footrest to a second structure with attachment members, and adjusting the attachment members to pull the foot members transversely toward said second structure such that said foot portions is under said second structure.

Other features, advantages, and aspects of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

One embodiment of the present invention relates to a footrest that is connectable to a structure that is in front of chair, for example, an airplane seat, when a person is in an enclosed space. The footrest is compact and collapsible to assure for east travel, and it is adjustable such that people of different sizes can use comfortably. The footrest comprises a first and second set of straps, so as to allow the user (also referred to herein as "passenger" to utilize the area between a piece of carry-on luggage under the seat in front of the passenger and the bottom of the seat in front of the passenger.

Referring now to FIG. 1, a footrest that is attachable or connectable to a structure (e.g. airline seat) in front of a user is shown generally at 100. The device 100 may comprise a first foot portion 102 and a second foot portion 104. Foot portions 102 and 104 comprise connecting members 106 and 108. The connectors 106 and 108 may comprise male and female portions that may be press fit or fit by interference such that they are easily connectable and separable. Each of the connecting members will be discussed in greater detail in relation FIG. 3.

Referring still to FIG. 1, a first pair of support portions 110, 112 are connected to a bridging member 114 on opposite ends of the bridging member 114. A first connection point 116 is coupled to the support portion 110, while the bridging member 114 is couple to support member 112 through connection point 118. The support portions 110 and 112 may be coupled and decoupled to the bridging member 114 through the use of, in this exemplary embodiment, snaps fasteners. In other optional embodiments, the coupling and decoupling may occur via Velcro, clasps, buttons, male and female screw threads and like. In another optional embodiment, the support portions 110, 112 and bridge member 114 may be a single structure or element.

The bridge member 114 is further coupled to each foot portions 102 and 104, which will be discussed in greater detail with reference to FIG. 2. Each of the of the support portions 110, 112 are fitted with adjustable slides 120 and 122. The adjustable slides operate to shorten or lengthen each of the support portions such that a user can alter the length of each of the support portions 110 and 112. The adjustable slides 120 and 122 may comprise any adjustable buckle strap or analogous adjustable slide. At an end of each support portion 110, 112 are connector elements 124 and 126. In this exemplary embodiment, connector elements 124, 126 may comprise hooks which are configured for connection to, for example, the underside of an airline food tray 130 or the metal side or back bars of said food tray 130.

With further reference to FIG. 1, a pair of transverse attachment members 132, 134 are coupled to the support members 110, 112, respectively. The transverse attachment members 132, 134 may be coupled and decoupled to the bridging member 114 through the use of, in this exemplary embodiment, snaps fasteners. In other optional embodiments, the coupling and decoupling may occur via Velcro, clasps, buttons, male and female screw threads and like. In another optional embodiment, the support portions 110, 112 and transverse members 132, 134 may be a single structure or element.

Like the support members 110, 112, each of the transverse attachment members 132 and 134 may comprise, or be fitted with a second pair adjustable slides 136 and 138. The second pair of adjustable slides 136, 138 operate to shorten or lengthen each of the support portions such that a user can alter the length of each of the support portions 132 and 134. The adjustable slides 132 and 134 may comprise any adjustable buckle strap or analogous adjustable slide. At an end of each support portion 132, 134 are a second set of connector elements 140 and 142. In this exemplary embodiment, connector elements 140 and 142 may comprise hooks. However, unlike the first connector elements 120 and 122, the connector elements 140 and 142 are configured for attachment under the seat that is positioned in front of the passenger. In this way, a user can transversely adjust the slides 132, 134 to pull the users feat in an approximately transverse and also vertical direction (e.g., approximately twenty five degrees) so as to avoid any carry-on luggage under the seat in front of the user, and comfortably being able to rest his or her feat in the space between the bottom of the seat and carry-on.

Figure 2:
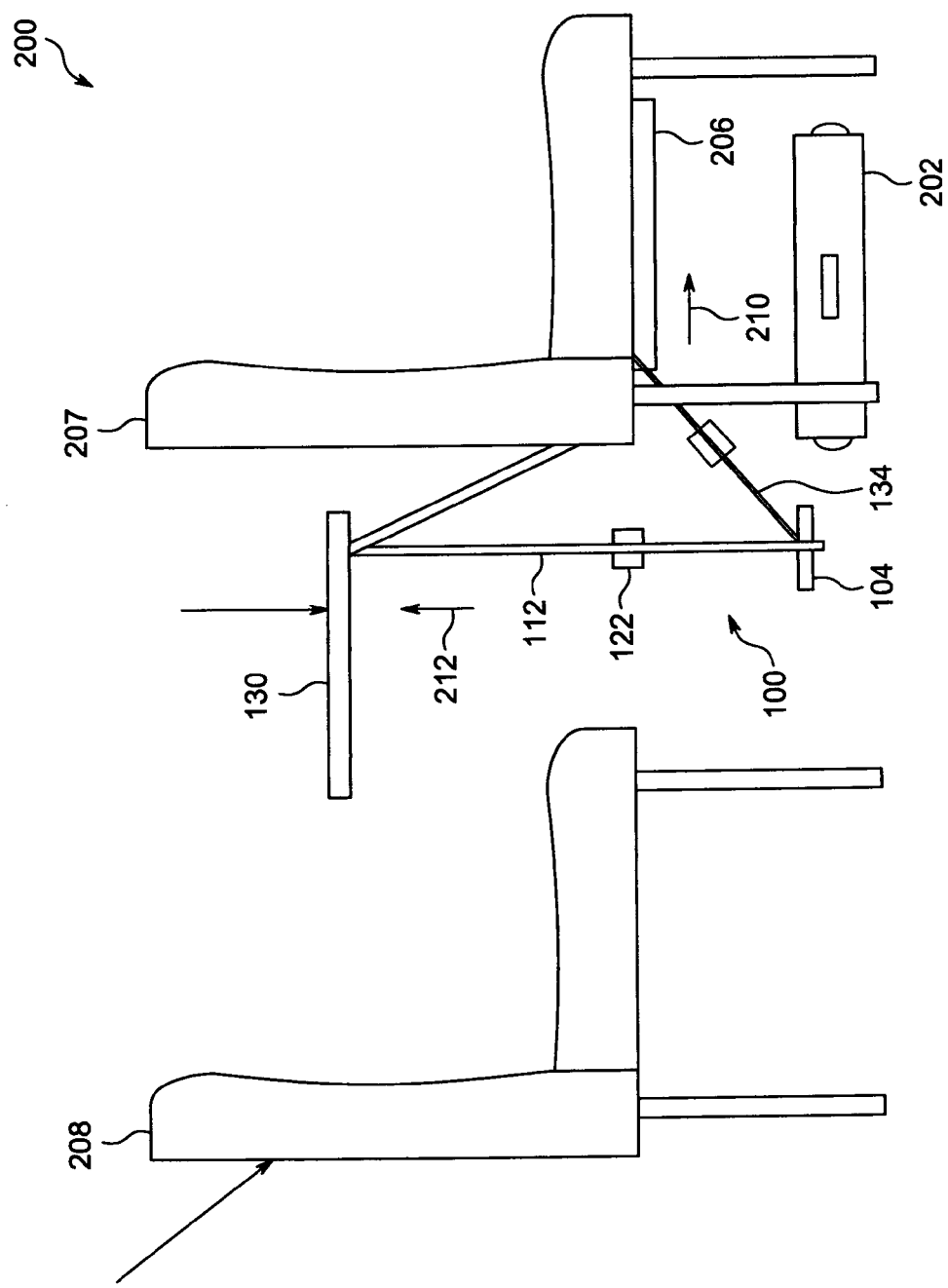
FIG. 2 is a side view of in accordance with an embodiment of the present invention.

Referring now to FIG. 2, a side view of the foot rest 100 is shown together with each passenger seat, shown generally at reference numeral 200. As shown, support member 112 is connected to the food tray bar 130. The adjustable strap 122 functions to move the foot rests 104 in a vertical direction, as shown in arrow 212. Transverse attachment member 134 is shown attached to the bracket 206 and 204. The transverse attachment member 134, using adjustable slide 138, functions to move the foot portion 104 in a transverse direction as shown in arrow 210, such that the passengers feet, when seated in chair 208, can utilize the area between the carry on luggage 202 and the seat 204 bottom.

Figure 3A:
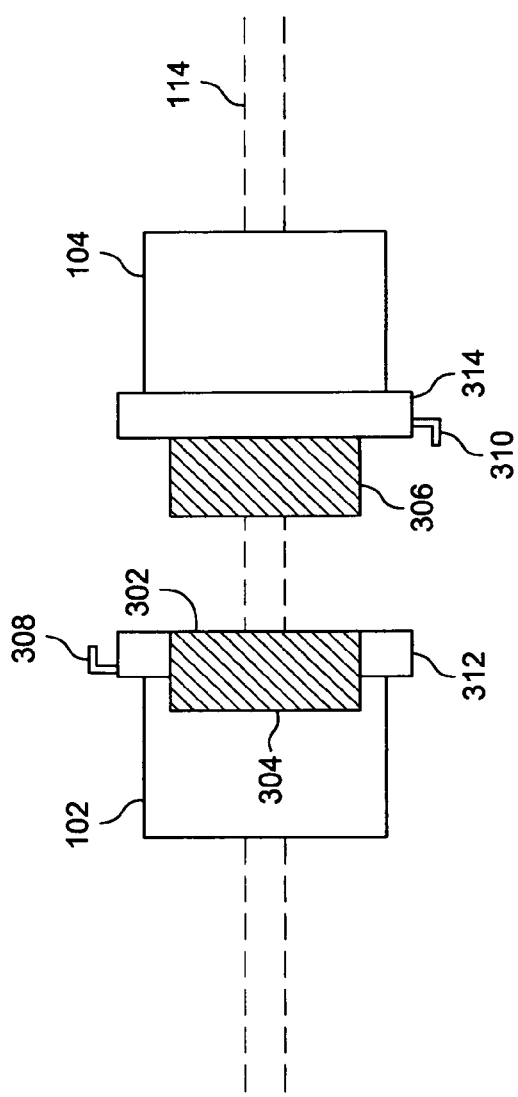
FIG. 3a is a top view of the footrest in its detached and collapsed state in accordance with an embodiment of the present invention.

Referring now to FIG. 3a, a top view of foot portions 102 and 104 are shown in greater detail to illustrate the collapsibility, connectivity and de-connectivity of said foot rest 100. For reference, bridge member 114 is shown as dashed line 114. In this exemplary embodiment, foot portion 102 comprises female screw thread portion which forms a cavity 304 inside the foot portion 102. Foot portion 104 comprises make screw thread 306, which is configured for mating with female portion 302. In other optional embodiments of the present invention, other types of fits can be used. For example, foot portion 102 can be fitted with foot portion 104 using interference, press, or frictions fits. Other optional embodiments may include clasps 308 and 310 on rings 312 and 314 which connect the opposite ring 308 or 310 for attachment.

Figure 3B:
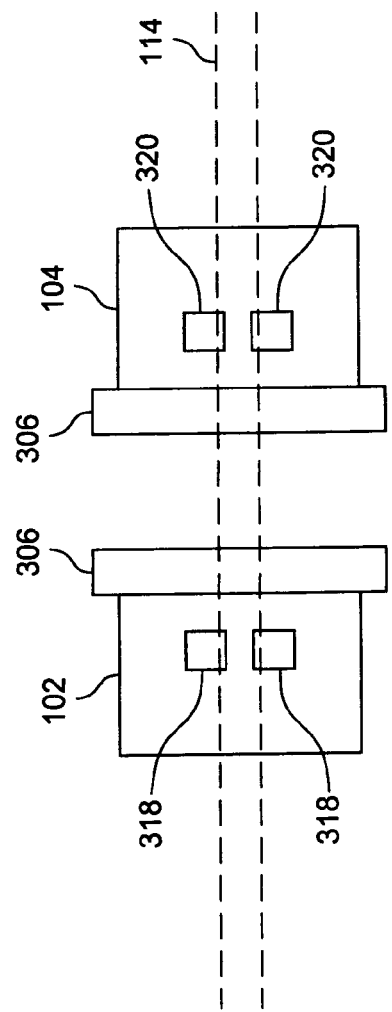
FIG. 3b is a bottom view of the footrest in its detached and collapsed state in accordance with an embodiment of the present invention.

Referring now to FIG. 3b, a bottom view of foot portions 102 and 104 are shown in greater detail to illustrate connectivity of said foot rest 100 to bridge member 114 which is shown as dashed line 114. Clasps 318 and 320 are attached to each of the foot portion s 102 and 104. The clasps 318 and 320 are configured such that they may be detachable from bridge portion 104. In an optional embodiment of the present invention, the foot portions 102 and 104 are connected to the bridge member and are not removable, such as by using rivets, screws, adhesives, and the like.

Figure 4:
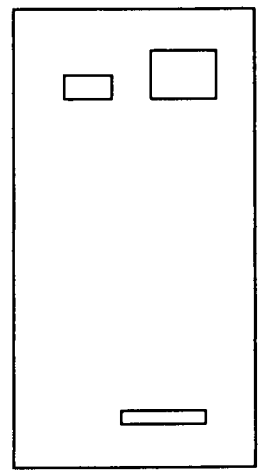
FIG. 4 is a top view of the foot portions in accordance with an embodiment of the present invention.
Figure 4:
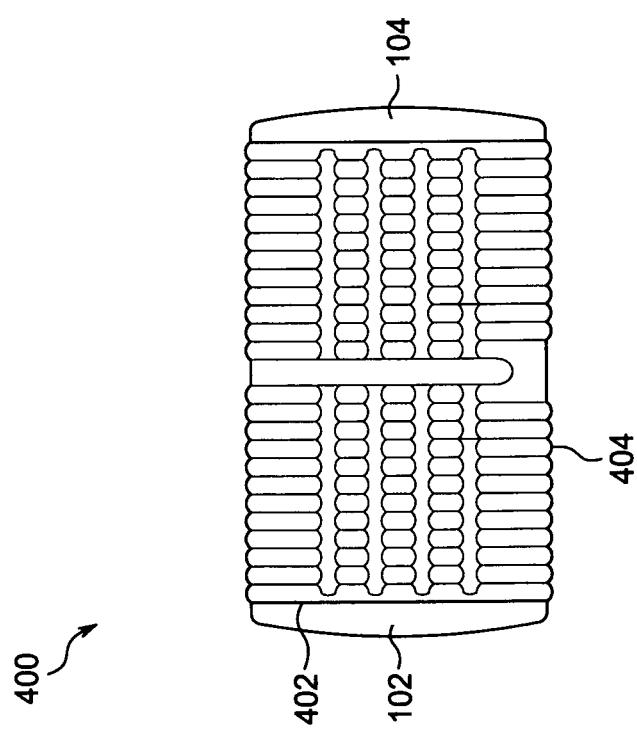

With reference now to FIG. 4, a more detailed illustration of the foot portion 102 and 104 is shown generally at 400. The foot portions 102 or 104 may comprise a shell that is constructed from any type of commercial plastics and/or other polymers that have sufficient tensile strength. A soft cover shell 402 is provided that covers the foot portions, which can be constructed of, for example, rubber or foam. The foot rests may be further provided with certain massaging features such as bumps and ridges 404. In other exemplary embodiments, the foot rests 102, 104 may be battery powered and have power massaging features as well.

Figure 5:
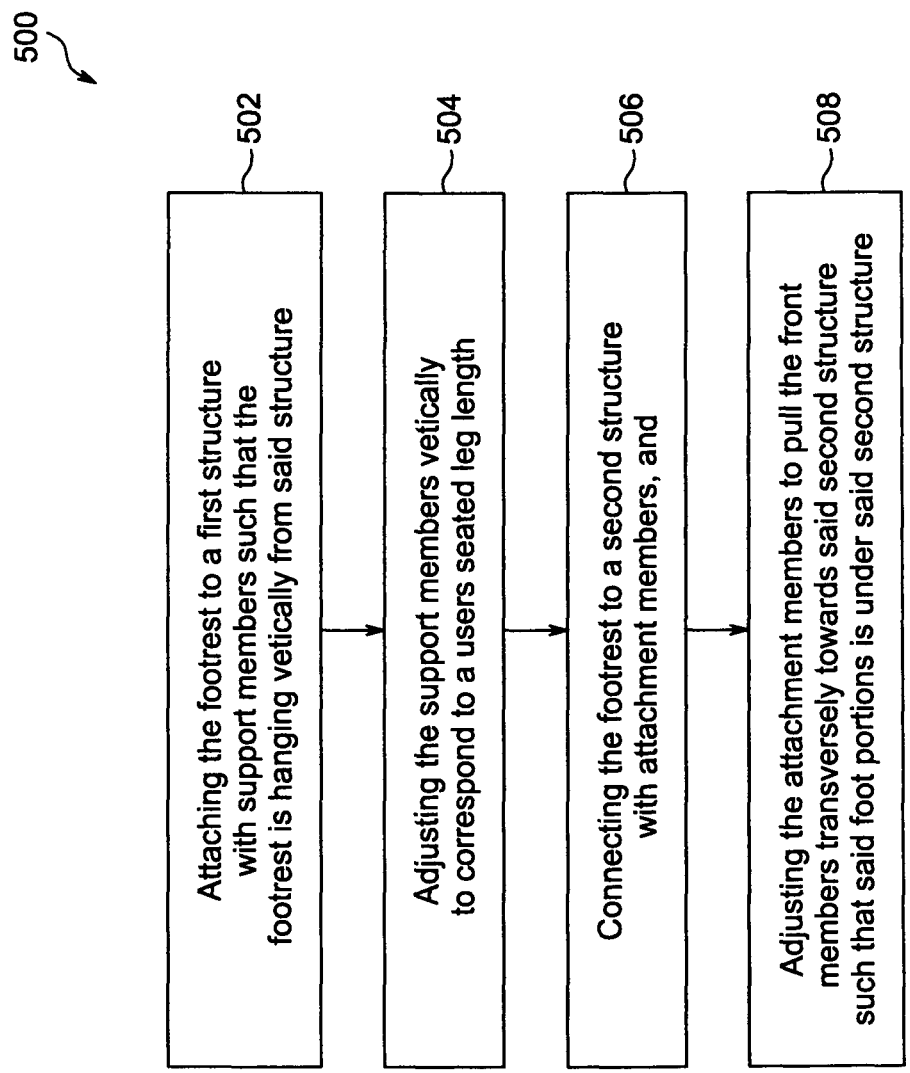
FIG. 5 is a step-wise diagram in accordance with an embodiment of the present invention.

Referring now to FIG. 5, there is shown a flow chart to better help illustrate a method for attaching a foot rest to a chair to utilize a small area under the chair in front a passenger shown generally at 500. While the flowchart shows an exemplary step-by-step method, it is to be appreciated that a skilled artisan may rearrange or reorder the steps while maintaining like results.

Attaching a footrest to a food tray step 502 may comprise connecting, via connector elements 124 and 126 to the food tray. The connector elements, as shown in FIG. 2. In this exemplary embodiment, connector elements 124, 126 may comprise hooks which are configured for connection to, for example, the underside of an airline food tray 130 or the metal side or back bars of said food tray.

Connecting the foot rest to an underside of chair in front may comprise providing a pair of transverse attachment members 132, 134 which are coupled to the support members 110, 112, respectively, and at each end comprise connector elements 140 and 142. The connector elements 140 and 142 may comprise hooks and are configured for attachment under the seat that is positioned in front of the passenger.

Adjusting the transverse attachment members such that the foot portions 102, 104 are pulled under the seat in the area step 106 may comprise providing adjustable slides 136 and 138. The second pair of adjustable slides 136, 138 operate to shorten or lengthen each of the support portions such that a user can alter the length of each of the support portions 132 and 134. The adjustable slides 132 and 134 may comprise any adjustable buckle strap or analogous adjustable slide. The adjustment portions are configured for attachment under the seat that is positioned in front of the passenger. In this way, a user can transversely adjust the slides to pull the users feat in an approximately transverse and also vertical direction so as to avoid any carry-on luggage under the seat in front of the user, and comfortably being able to rest his or her feat in the space between the bottom of the seat and carry-on.

The method may further comprise adjusting the height of foot rests in a vertical direction though use of adjustable slides on each of the support portions 110, 112. The adjustable slides operate to shorten or lengthen each of the support portions such that a user can alter the length of each of the support portions 110 and 112.

The method may further comprise collapsing the footrest for storage. This step may comprise a providing one foot portion having female screw thread portions and another having make screw portions. A user can unscrew the foot portions from the other to collapse said device 100. In other optional embodiments of the present invention, other types of fits can be used. For example, foot portion 102 can be fitted with foot portion 104 using interference, press, or frictions fits. Other optional embodiments may include clasps 308 and 310 on rings 312 and 314 which connect the opposite ring 308 or 310 for attachment.

Figure 6:
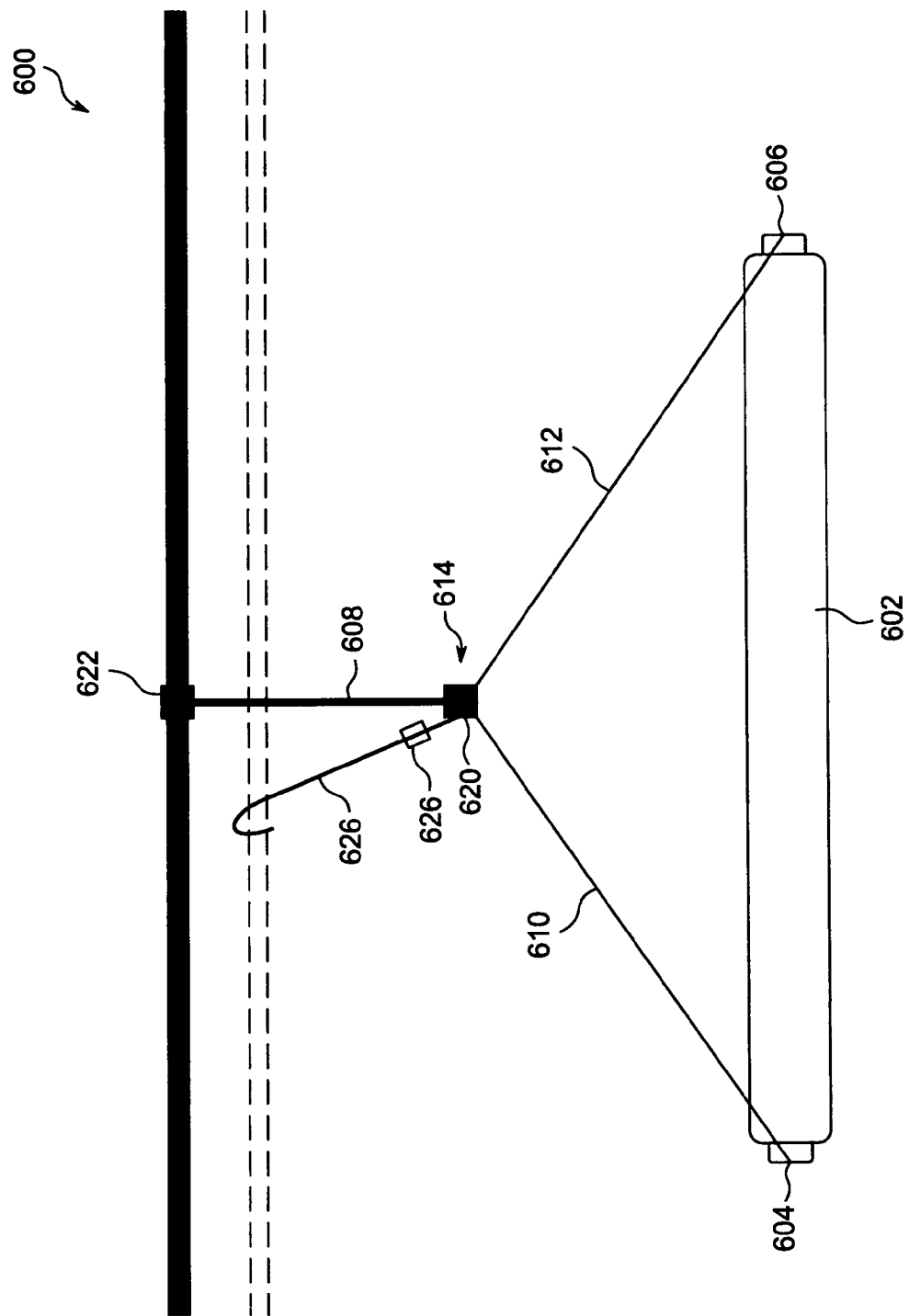
FIG. 6 is a front view of an optional embodiment of the present invention.

Referring now to FIG. 6, an optional embodiment of a footrest that is attachable or connectable to a structure (e.g. airline seat) in front of a user is shown generally at 600. The device 600 may comprise a single foot portion 602. Of course, the foot portion 602 may be bifurcated in a manner similar to that shown in FIG. 1.

A first pair of support portions 610, 612 are connected to the footrest at first 604 and second ends 606 of the foot portion 602. The support portions 610 and 612 diverge into a single connection line 608 At the connection point 614, an adjustable slide 620 is attached. The adjustable slides operate to shorten or lengthen each the support portions such that a user can alter the length of each of the support portion 608. The adjustable slides 620 may comprise any adjustable buckle strap or analogous adjustable slide. At an end of the support portion 608 is a connector element 622. In this exemplary embodiment, connector element 622 may comprise hooks which are configured for connection to, for example, the underside of an airline food tray or the metal side or back bars of said food tray.

A transverse attachment members 624 is coupled to the support members 610 and 612 and connection line 608 at connection point 614. The transverse attachment member 608 may be coupled and decoupled to the connection point 614 through the use of, in this exemplary embodiment, snaps fasteners.

Like the support member 608 the transverse attachment member 624 may comprise, or be fitted with a second adjustable slide 626. At an end of transverse member 624, a connector element is attached which may comprise a hook configured for attachment under the seat that is positioned in front of the passenger. In this way, a user can transversely adjust the slides 626 to pull the users feat in an approximately transverse and also vertical direction (e.g., approximately twenty five degrees) so as to avoid any carry-on luggage under the seat in front of the user, and comfortably being able to rest his or her feat in the space between the bottom of the seat and carry-on.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

The invention claimed is:

1. A portable footrest device, the device comprising:
   a single support portion having a first end and a second end, the first end having affixed thereto a first connector element, and the second end having affixed thereto a second connector element, both the first and second connector elements being configured for releasable connection to a structure;
   a first foot portion and a second foot portion coupled to the single support portion and positioned in between each of the first end and the second end of the single support portion, wherein the first foot portion has a male connector portion, and the second foot portion has a female connector portion configured for coupling and decoupling the first foot portion and the second foot portion to form a single contiguous footrest; and
   a bridge member disposed on the single support portion, and configured for attachment to the support portion to provide rigidity, wherein the bridge member is de-connectable from the single support portion at each end of the bridge member.

2. The device of claim 1, wherein said first and second foot portions are coupled with an interference, press, or friction fit, and wherein the single support portion is a flexible member disposed at least partially internally within the first foot portion and the second foot portion.

3. The device of claim 1, wherein the first end and the second end each comprise an adjustable slide, the adjustable slides configured to alter a length of the first and second connector elements in a vertical direction.

4. The device of claim 1, further comprising first and second transverse attachments members, wherein said first transverse attachment member is coupled to the support portion on the first end and said second transverse attachment member is coupled to the support portion on the-second end.

5. The device of claim 4, wherein said first and second transverse attachment members have first and second ends, said first and second transverse attachment members comprise connecting members on each of their second ends, the connecting members configured for connection to a second structure.

6. The device of claim 4, wherein said first and second transverse attachment members comprise adjustable slides, the adjustable slides configured to alter the length of the transverse attachment members in an approximately transverse direction, or at an approximately twenty five degree angle.

7. The device of claim 4, wherein said first and second transverse attachment members are configured to couple and decouple to and from the support portion.

8. The device of claim 4, wherein the first structure is a food tray of an airplane and the second structure is an undercarriage of an airplane seat, and wherein the first and second transverse attachment members are configured to hold the foot portions under the airplane seat.

9. The device of claim 1, wherein said first and a second foot portions comprise a soft shell cover having protrusions thereon.

10. The device of claim 1, wherein the first and a second foot portions further comprise clasps that connect the first and second foot portions together.

11. A method for utilizing an enclosed space to rest a user's feet on a footrest, the method comprising:
    providing a footrest having a single support portion, a first foot portion and a second foot portion being coupled to the single support portion and positioned in between each of a first end and a second end of the single support portion, and a bridge member disposed on the single support portion, and configured for attachment to the support portion to provide rigidity, wherein the bridge member is de-connectable from the single support portion at each end of the bridge member;
    attaching the footrest to a first structure using first and second connector elements such that the footrest is hanging vertically from said structure;
    adjusting the foot portions vertically to correspond to a user's seated leg length;
    connecting the footrest to a second structure with first and second attachment members;
and
    adjusting the attachment members to pull the foot portions transversely toward said second structure such that said foot portions is are under said second structure.

12. The method of claim 11, wherein said first structure is the food tray of an airplane and said second structure is the bottom of a seat of the airplane.

13. The method of claim 11, further comprising collapsing the footrest for storage, wherein the collapsing step comprises providing the first and second foot portions with corresponding male and female portions.

14. The method of claim 13, further comprising decoupling the first foot portion from the second foot portion, wherein the single support portion is a flexible member disposed at least partially internally within the first foot portion and the second foot portion and provides for decoupling the first foot portion and second foot portion while remaining at least partially disposed within each foot portion.

15. The method claim 11, wherein said first and second foot portions are coupled with an interference, press, or friction fit.

16. The method of claim 11, wherein adjusting the attachment members comprises providing first and second adjustable slides, the first and second adjustable slides configured to alter the length of the attachment members in a vertical direction.

17. The method of claim 16, wherein adjusting the attachment members comprises providing a third and a fourth adjustable slide, the third and fourth adjustable slides configured to alter the length of the attachment members in a transverse direction.

* * * * *